(12) United States Patent
Freijsen et al.

(10) Patent No.: US 9,703,264 B2
(45) Date of Patent: Jul. 11, 2017

(54) TIMING DEVICE

(75) Inventors: Marion Freijsen, Putten (NL); Martin Finlan, Doncaster (GB)

(73) Assignee: ELEGIO BV, Putten (NL)

( * ) Notice: Subject to any disclaimer, the term of this patent is extended or adjusted under 35 U.S.C. 154(b) by 0 days.

(21) Appl. No.: 13/578,387

(22) PCT Filed: Feb. 11, 2011

(86) PCT No.: PCT/GB2011/050265
§ 371 (c)(1),
(2), (4) Date: Sep. 24, 2012

(87) PCT Pub. No.: WO2011/098830
PCT Pub. Date: Aug. 18, 2011

(65) Prior Publication Data
US 2013/0010574 A1      Jan. 10, 2013

(30) Foreign Application Priority Data

Feb. 12, 2010   (GB) .................................. 1002450.3

(51) Int. Cl.
| | | |
|---|---|---|
| G04F 1/00 | (2006.01) | |
| G04F 1/02 | (2006.01) | |
| G04F 13/04 | (2006.01) | |
| H01M 2/02 | (2006.01) | |
| H01M 12/08 | (2006.01) | |
| G09F 3/00 | (2006.01) | |

(52) U.S. Cl.
CPC .................. *G04F 1/00* (2013.01); *G04F 1/02* (2013.01); *G04F 13/04* (2013.01); *G09F 3/0291* (2013.01); *G09F 3/0292* (2013.01); *H01M 2/0202* (2013.01); *H01M 12/08* (2013.01)

(58) Field of Classification Search
CPC .... G04F 13/04; G04F 1/00; G04F 1/02; F04F 1/005; G01K 3/04; G01N 31/229; H01M 2/0202; H01M 12/08
USPC ..................... 368/10, 113, 114, 327; 116/206
See application file for complete search history.

(56) References Cited

U.S. PATENT DOCUMENTS

| | | | |
|---|---|---|---|
| 4,007,472 A | | 2/1977 | Land |
| 4,092,464 A | | 5/1978 | Dey et al. |
| 4,098,965 A | | 7/1978 | Kinsman |
| 4,292,916 A | * | 10/1981 | Bradley et al. ............... 116/205 |
| 5,802,015 A | * | 9/1998 | Rothschild et al. ............ 368/10 |
| 6,198,701 B1 | * | 3/2001 | De Jonghe et al. .......... 368/327 |

(Continued)

FOREIGN PATENT DOCUMENTS

| | | |
|---|---|---|
| GB | 2 243 825 | 11/1991 |
| GB | 2 344 101 | 5/2000 |

(Continued)

*Primary Examiner* — Vit W Miska
(74) *Attorney, Agent, or Firm* — Carmody Torrance Sandak & Hennessey LLP

(57) ABSTRACT

The timing device is a lifetime monitor for indicating when the usable lifetime of a product has ended or for indicating the timing for regular usage of a product. The timing device has a timing initiator, a power supply in the form of a membrane zinc air battery and a visual or audible indicator. The timing initiator is a tear-off air blocking membrane which lets in air when the tear off film is removed. The timing device is capable of indicating a predetermined passage of time which is substantially independent of ambient temperature.

7 Claims, 2 Drawing Sheets

(56) References Cited

U.S. PATENT DOCUMENTS

| | | | |
|---|---|---|---|
| 6,224,751 B1* | 5/2001 | Hofmann | C02F 1/003 |
| | | | 206/459.1 |
| 6,985,408 B2* | 1/2006 | Quine | 368/10 |
| 7,372,780 B1 | 5/2008 | Braunberger | |
| 7,643,378 B2* | 1/2010 | Genosar | B65D 33/2591 |
| | | | 206/459.1 |
| 2004/0013048 A1* | 1/2004 | Adamy | 368/327 |
| 2004/0156418 A1 | 8/2004 | Debord et al. | |
| 2004/0240324 A1* | 12/2004 | Isbitsky et al. | 368/327 |
| 2006/0227669 A1* | 10/2006 | Pennaz et al. | 368/327 |
| 2007/0064541 A1 | 3/2007 | Kagan | |
| 2008/0210152 A1* | 9/2008 | Robinson et al. | 116/206 |
| 2008/0241668 A1* | 10/2008 | Wang Chen | 429/160 |
| 2009/0016176 A1* | 1/2009 | Braunberger | G04F 13/04 |
| | | | 368/327 |
| 2009/0052285 A1* | 2/2009 | Haas | 368/327 |
| 2010/0149929 A1* | 6/2010 | Braunberger | 368/223 |

FOREIGN PATENT DOCUMENTS

| | | |
|---|---|---|
| GB | 2 397 022 | 7/2004 |
| GB | 2 419 868 | 5/2006 |
| WO | 01/26993 | 4/2001 |
| WO | 2009/129998 | 10/2009 |

* cited by examiner

TIMING DEVICE

CROSS REFERENCE TO RELATED APPLICATIONS

This application is a National Stage application of International Application No. PCT/GB2011/050265, filed Feb. 11, 2011, the subject matter of which is incorporated by reference in its entirety.

FIELD OF THE INVENTION

The present invention relates to a timing device such as a lifetime monitor for providing an indication of when the usable lifetime of a product has ended or as a usage monitor for indicating the timing of regular usage of a product.

BACKGROUND TO THE INVENTION

Consumer products usually have two lifetimes, the best before date if unopened and the usually more restrictive useful life after it has been opened. Although devices are available which integrate the temperature/time environment of e.g. food products to show the point in time at which the contents are unsafe or should not be consumed, no devices are available which provide information of usage lifetime calculated independent of temperature.

For many packaged consumer products, the usable lifetime of the product is considerably reduced when the package is opened. In addition, many products such as cosmetics, creams or sun-creams have a lifetime after which the product effectiveness is substantially reduced. Moreover certain cosmetic products such as mascara and medication actually carry an increased risk of infection once beyond the lifetime stipulated by manufacturers of such products, e.g. 3 months, but this lifetime currently cannot be tracked by the consumer.

In GB 2397022 an air freshener is described which includes an end-of-life indicator. The air freshener includes a lifetime marking on the product covered by an additional gel which shrinks as a result of exposure of the additional gel to air. The shrinkage of the additional gel ultimately results in exposure of the lifetime marking as an indication that the device needs to be replaced. The additional gel shrinks as a result of evaporation and thus is susceptible to variations in ambient temperature.

A timing device for packaging enclosures is described in GB 2344101. The packaging consists of a container with a screw cap and the screw cap includes an indicator disk mounted on the inside of the cap but visible through a window in the screw cap. The indicator disk is constructed from a pair of foil sheets that are bonded together to form two separate sealed compartments. One of the compartments contains humid air and the other a water-sensitive colour changing composition. When the screw cap is first removed from the container, to access the contents of the container, the bonding between the two compartments in the indicator disk is broken. Exposure of the water-sensitive composition to the humid air causes a colour change. The rate at which the colour change occurs is determined by a second composition with which the water-sensitive composition is mixed. A similar timing device is described in WO 01/26993. This describes a sealed compartment containing a colour-changing substance mounted in the cap to a container. Removal of the cap from the container breaks the seal to expose the colour-changing substance to an activation chemical thereby triggering the colour change which is viewed via a transparent section of the container cap.

A different colour-changing device is described in GB 2243825. A multi-laminar thermoplastic tamper-evident member is described in which one of the thermoplastic layers has a warning substance printed or sprayed on it which is reactive to ambient air. The tamper-evident member is intended for application to a container in a manner which results in at least one of the layers of the tamper-evident member being broken when the container is opened. Breakage of at least one layer of the member exposes the warning substance to ambient air which in turn results in the substance changing colour as a warning that the container has been opened.

In GB 2419868 a food date indicator is described which comprises a label for attachment to a package. The label is formed of a sealed envelope within which an oxygen-sensitive strip is located. Opening the package results in the label being torn at one end to expose the inner oxygen-sensitive strip. Oxidation of the strip causes a colour change that over a predetermined period of time extends along the length of the strip. Thus the amount of the strip that has changed colour is representative of the time since the package was first opened.

A timing device is also described in U.S. Pat. No. 7,372,780 in this case comprising two electrodes with an electrochromic material between the two electrodes. The timing device is attached to an activating mechanism that connects the two electrodes forming a closed circuit. Once connected, the circuit results in a colour change in the electrochromic material as a result of depletion or partial depletion of the material.

An alternative timing device which is capable of measuring a time frame between a first opening and closing of a package and a predetermined later time is described in WO2009/129998. This timing device employs a diffusion path integrated into a closure cap.

SUMMARY OF THE INVENTION

The present invention seeks to provide a timing device which is adapted for attachment to a product container and which is activated by the opening of the product container, e.g. a mascara tube. The device is intended to inform the consumer that the product should not be used when a given time has elapsed from the instant that the container lid is removed. This information is communicated by changing the appearance of the device or by generating some other visual or audible warning. It has an action which is independent of the package contents. The present invention also seeks to provide a device adapted to generate a visual or audible reminder for regular use of a product. Thus, the device may be used in association with the packaging of products such as toothpaste or medicaments to generate a visual or audible reminder once or twice a day to encourage regular use.

The present invention also seeks to address a problem that arises with known timing devices such as those described earlier. In particular, the present invention seeks to provide a monitor that is substantially or wholly independent of ambient temperature.

A further aim of the present invention is to provide a low cost device which is suitable for use with the form and size of the container in which the product is stored.

A still further aim of the present invention is to provide a device which includes a tab which must be pulled off to allow the container to be opened and which serves as a timer trigger.

The present invention therefore provides a timing device comprising a timer, an informative device, and a trigger and wherein the timing device is adapted for attachment to a product container; the trigger is connected to the timer and adapted to automatically activate the timer the first time the product container is opened; and the timer is connected to the informative device to confirm expiration of a predetermined duration of time since the product container has been opened representative of the end of useful life of the product.

In a preferred embodiment the device is small enough to be attached to any type of cosmetic container including, but not limited to, a tube, a small roller container (mascara) or a jar. The device is very easy to attach to each type of container by the manufacturer of the cosmetic containers and intuitive to use by the consumer. By removing the tab from the device, the device will then indicate when the period of safe use has passed. In addition, the device may be modified such that it can be used to indicate if the product has been exposed to over-heating.

The device is envisioned as being used particularly, but not exclusively, in the cosmetic and pharmaceutical container market. The market includes but is not limited to perishable non-food stuffs, toiletries, perfumes, oils, medications, sun creams and so forth. The range of target product lifetimes envisaged is from 1-36 months e.g. 1, 3, 6, 12, 24 or 36 months.

The lifetime monitor is also envisaged as a peel-off lifetime label with an adhesive rear surface for use by consumers. The lifetime labels may be removed from their releasable backing material and adhesively attached to items including but not limited to non-food stuffs, the packaging of perishable foods stuffs and/or frozen food to indicate to the consumer a date in the future beyond which they have decided the item should not be used.

A further use of the lifetime monitor is in secondary packaging as part of the management of a supply chain. The lifetime monitor may be used to indicate which pallets of products have been in a warehouse for the longest and so should be sent to retailers first.

With the present invention the timing device is laminar and as such may be attached like a label to a product container without significantly affecting the overall dimensions of the container. Also, the timer relies upon a controllable chemical reaction to determine the time duration before the lifetime monitor indicates the end of the useful lifetime of the product. Control of the chemical reaction may be achieve for example as a result of the quantity of a reagent available for the reaction; the rate at which a reagent is able to diffuse through a material to come into contact with a second reagent; or the rate at which a first reactive agent e.g. air reaches the second reagent e.g. through control of pore sizes. As a result of the chemical reaction being controllable, the operation of the timer is substantially independent of ambient temperature.

BRIEF DESCRIPTION OF THE DRAWINGS

Embodiments of the present invention will now be described by way of example only with reference to the accompanying drawings, in which.

DETAILED DESCRIPTION OF PREFERRED EMBODIMENTS

Figure 1:
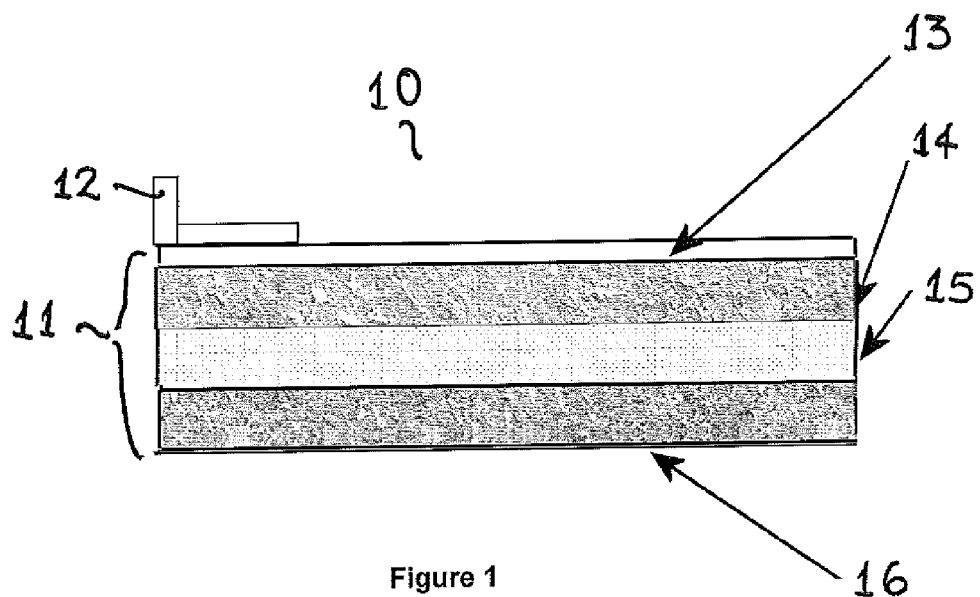
FIG. 1 illustrates schematically a laminar membrane structure for a first embodiment of a lifetime monitor in accordance with the present invention.

A timing device in the form of a lifetime monitor 10 is shown in FIG. 1. The monitor 10 generally comprises a main body 11 including a timer and a tab 12. The lifetime monitor 10 is initiated by the opening of the product container to which it is attached. This trigger mechanism is preferably implemented by means of the adherent tab 12 which is consumer friendly and can precede an unscrewing action if appropriate. The action of removing the tab 12 can remove a light blocking foil, remove a conducting strip, allow access of air as in a zinc air battery or be some other mechanism for auto-initiating the timer. Zinc air batteries can also act as the timing mechanism, having an output voltage which becomes zero when the zinc is depleted. The tab 12 may also be in the form of a perforated strip which is torn in the act of unscrewing the lid of a container to which it is attached.

The main body 11 of the monitor functions as the timer and indicator mechanism. Thus, the main body may include at least three membrane layers stacked one on top of the other in a laminated structure. The first membrane is at a first surface of the main body 11. The first membrane which is porous is coated with an adhesive material and is impregnated with a first compound e.g. an acid. The first membrane is separated from the third membrane by a diffusion membrane and the third membrane includes a second compound that is reactive with the first compound. As the first compound diffuses through to the third membrane it reacts with the second compound so that the concentration of the first compound is reduced to zero after a time related to the concentration of the second compound in the third membrane.

The third membrane acts as an indicator membrane impregnated with the second compound. The first and second compounds are chosen so that when they react this produces a visual change, e.g. alkali and litmus dyes (*Roccella tinctoria*), i.e. constant pH buffer in the alkali range is maintained until the alkali is depleted.

With the monitor 10 shown in FIG. 1, the colour of e.g. a message printed in the alkali region i.e. the third membrane would change from blue to red and could be made to stand out from a blue, unchanged, background. Many compounds for which titration is possible would be suitable for use in this way, including acid/alkali, oxidation/reduction processes etc.

Figure 2:
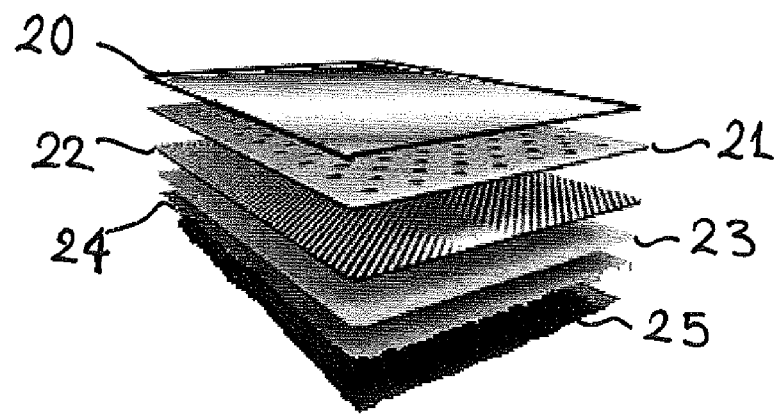
FIG. 2 illustrates a multi-layered structure of a membrane zinc-air laminar battery for use with the life time monitor of FIG. 1.

FIG. 2 illustrates an alternative timing mechanism for use with the lifetime monitor 10. In FIG. 2 the main body 11 of the monitor includes a flexible and conformable laminar battery of the type known to have been used in Polaroid™ camera film packs. The laminar battery is used in combination with a light emitting material which will continue to give off light for as long as the battery delivers charge. Any of the existing battery concepts could be used for delivering the necessary charge to the light emitting material. Where a laminar battery is required, those described in U.S. Pat. Nos. 4,092,464, 4,007,472 and 4,098,965 may be used. However, preferably an adaptation of known laminar battery technology is used to provide a laminar and flexible zinc/air battery. from Alternative laminar power cells are copper/zinc and lithium ion etc cells. Suitable light emitting or indicator materials include organic light emitting diode sheets (OLEDs), leds, LCDs and electronic paper.

For the lifetime monitor the preferred battery is a zinc air laminar battery that is flexible and conformable. The component(s) of the battery and the amount of the component(s) are selected so that the component(s) are depleted as the battery is discharged. In this way the duration of the battery life may be controlled. The lifetime of the battery is therefore selected to correspond to the product lifetime.

In a further alternative, the timing mechanism may comprise a silicon or organic timing circuit printed or put down by other means on a polymer or graphene membrane, powered by a laminar battery or by a photons to electrons converter. The indicator material described above would be used to show when the product lifetime had expired.

In a yet further alternative timing mechanism (not illustrated), a laminated structure includes an oxidisable or reactive film which is exposed to air when the trigger tab 12 is removed to open the container. When the film is totally reacted, the end of life message is revealed.

Where the surface of the product container includes microstructures, channels may be incorporated in the container mould to allow the possibility of other diffusion processes such as gas diffusion to be used in combination with the lifetime monitor.

All of the timing mechanisms described above are preferably independent of those temperature effects which would affect the timing. However, it is also envisaged that the lifetime monitor 10 may be automatically responsive to temperature limit(s) to allow for shortening of the product lifetime where the product is exposed to temperatures above the manufacturers' recommended storage temperature e.g. 5-25° C.

A change of colour, either per se, or to differentiate a message from the surrounding area is an acceptable means of indication as a customer information display. Where the timer involves charge or voltage changes, a simple black and white LCD or electronic paper consumes little power to deliver the message. This minimises the size and charge delivery capability required of the battery. Where possible, colour change is preferred and can be realised by using OLED screen material.

Examples

Colour Change

FIG. 1 is a representation of a multiple membrane structure wherein the tabbed upper membrane 13, is transparent and is coated with liposomes containing a weak acid, e.g. acetic acid and which is impervious to the contents of the membrane below. Membrane 14 is transparent and is micro- or nano-structured to cause the liberated acetic acid to reach membrane 15. Membrane 15 is structured such as to allow the diffusion of the acid to membrane 16 which is impregnated with a pH sensitive indicator dye such as litmus and a measured quantity of an alkali such as calcium hydroxide in solution.

Electrical Display Type

Figure 3:
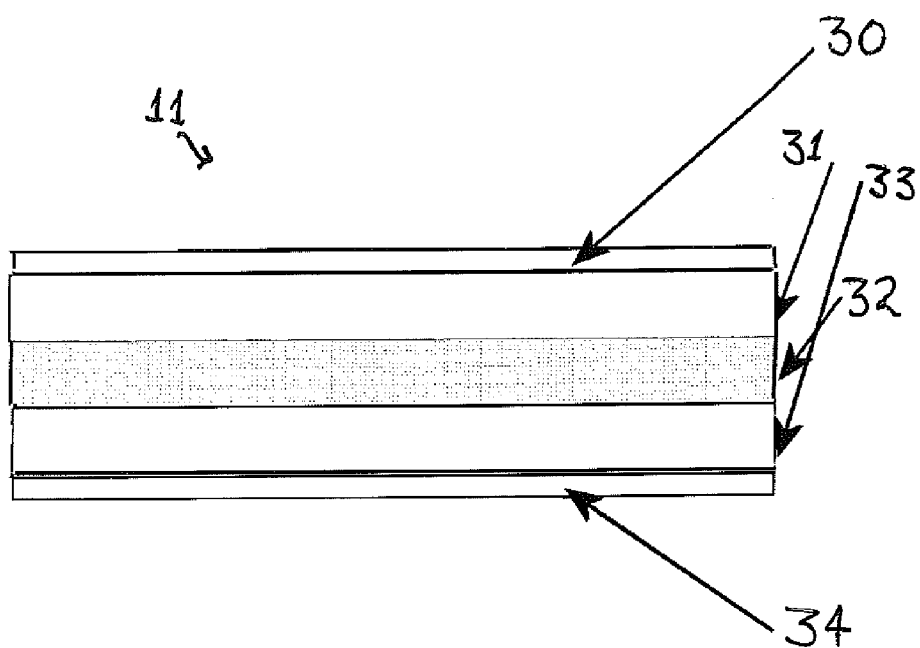
FIG. 3 illustrates schematically an electroluminescent film structure in an alternative embodiment of the lifetime monitor of the present invention.

FIGS. 2 and 3 illustrate a timing device including a zinc air laminar battery to power a display (not illustrated) to indicate residual life of a product. FIG. 2 shows the multi-layered structure of the membrane zinc-air battery:
 a tear off air blocking membrane 20;
 a porous air input controlling layer, which lets in air when the tear off film is removed 21;
 a porous air electrode, the anode 22;
 an interface containing electrolyte 23;
 a zinc electrode 24;
 an outer adhesive film which attaches the battery to the package 25.

The interface containing electrolyte 23 is preferably formed of a woven material having a hole diameter of 1-50 microns, more preferably 1-10 microns, more preferably still 2-5 microns and ideally 2 microns. The woven material may be made from man-made materials such as polyester, polypropylene, nylon or other plastics or from natural materials such as silk. Plastock™ 1-10 micron mesh is an example of a suitable material for use as the interface containing electrolyte.

A membrane zinc air battery is a flexible laminar battery making it particularly suitable for use as part of an adhesive label particularly for curved packaging surfaces because the laminar zinc air battery is capable of conforming to the curvature of a surface to which it is applied.

FIG. 3 shows a multilayer structure of an electroluminescent membrane for use in the lifetime monitor. A layer of organic phosphor with coloured overlays is sandwiched between two conductors and electric current applied across the phosphor layer rapidly charges phosphor crystals which emit visible light. The film thickness is typically between 0.25 mm-0.5 mm. The electroluminescent media is typically constructed using the following five layers:
 a clear graphics layer at the top 30;
 a clear conductive layer 31;
 a phosphor layer 32;
 a dark conductive layer 33;
 a insulating layer at the rear 34.

The use of an organic phosphor requires laminar electronics circuitry to convert a zinc air laminar battery voltage of about 1.5 volts to the 36 volts square wave needed by the fluorescent display. An alternative display which can operate directly from 1.5 volts is the OLED (Organic Light Emitting Diode) display, which is available and manufactured by several companies, e.g. Sony. OLEDs have quite simple structures: a luminescent organic thin film is sandwiched between cathode and anode. Charge carriers, such as electrons and holes, are injected into the organic layer, where they meet to form excitons. When the excitons decay, the organic molecules emit their characteristic light.

Sony's recent flexible and transparent organic light emitting diode (OLED) technology is currently being shown in prototypes featuring an OLED a mere 0.2 mm thick. The prototype devices are a Vaio™ notebook, a flexible e-book, and a Walkman™ bracelet. The OLED screen is transparent and flexible, and the viewing angle range is almost unlimited. OLED technology has a number of advantages over LEDs, including higher efficiency, faster response times, and no requirement for backlighting. The devices also have very low energy needs.

It will be apparent that the components of both timing mechanism and indicator mechanism may be deposited on the same films and interconnected by transparent deposited conductors.

Furthermore, the resulting flexible composite film can be wrapped round tubes or other curved product container surfaces as well as any symmetrical or flat packaging to emit light for message display, or to screen an expiry message until available power has run out when the expiry message is revealed. In the case of a zinc air laminar battery the lifetime is defined by the quantity of zinc and by the rate of air (i.e. oxygen) input to the battery e.g. by making the pore size of the air diffusion layer change appropriately as a function of temperature and as such can be made to be independent of the ambient temperature to which the package is exposed. An additional virtue of this approach is the ability to tailor the display to improve the visual appearance of the package.

The timing device may be provided as a sheet of peel-off lifetime labels each label having an adhesive rear surface. The lifetime labels may be removed individually from their releasable backing material and adhesively attached to items including, but not limited to, non-food stuffs, the packaging of perishable foods stuffs and/or frozen food to indicate to the consumer a date in the future beyond which the item should not be used.

A further use of the timing device is in secondary packaging as part of the management of a supply chain. The timing device may be used to indicate which pallets of products have been in a warehouse for the longest and so should be sent to retailers first.

A still further use of the timing device is in the generation of a visual or audible reminder at regular time intervals for the repeated use of a product. Thus, the timing device may be used in association with the packaging of products such as toothpaste or medicaments to generate a visual or audible reminder once or twice a day to encourage regular use. With this alternative use of the timing device, a power supply in the form of a laminar zinc air battery is preferred connected to a solid-state counter or other timing mechanism to trigger at regular time intervals the generation of a visual or audible reminder.

Further changes and alterations to the embodiments described herein are envisaged with departing from the scope of the invention as defined in the appended claims.

The invention claimed is:

1. A timing device comprising a timer, an informative device, and a trigger and wherein the timing device is adapted for attachment to a product container; the trigger is connected to the timer and adapted to automatically activate the timer the first time the product container is opened; and the timer is connected to the informative device which is configured to confirm expiration of a predetermined duration of time since the product container has been opened representative of the end of useful life of the product, and wherein the timer is a flexible zinc air battery, the flexible zinc air battery containing a selected amount of components which are exhausted at the end of the predetermined duration of time.

2. A timing device as claimed in claim 1, wherein the timing device is a multi-laminar product.

3. A timing device as claimed in claim 1, wherein the timer is substantially independent of ambient temperature.

4. The timing device of claim 1, wherein the trigger comprises an adhesive tab adapted to overlie and be attached to the opening junction of the product container.

5. The timing device of claim 1, wherein the trigger is attached to an air valve.

6. The timing device of claim 1, wherein the informative device includes a display which has a permanent visual message that is obscured until elapse of the predetermined duration of time.

7. The timing device of claim 1, wherein the informative device includes a display for displaying a visual message generated after expiration of the predetermined duration of time.

* * * * *